June 2, 1942.  J. M. BERGE  2,285,080
LOCK NUT
Filed Dec. 16, 1941
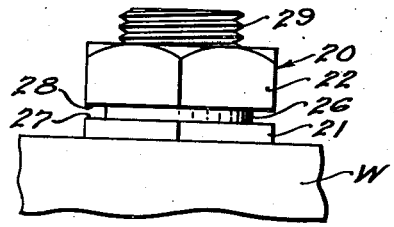
FIG. 1.
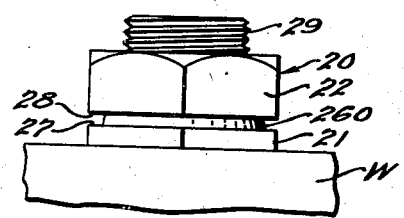
FIG. 5.
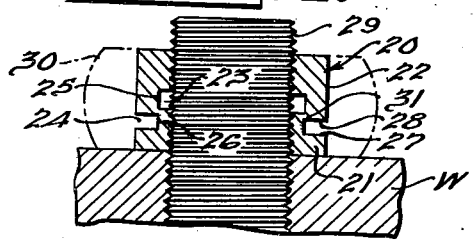
FIG. 2.
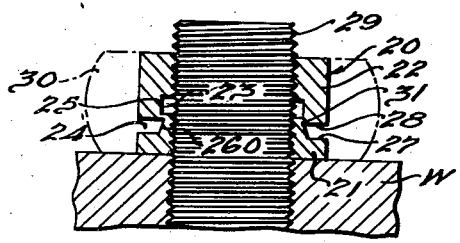
FIG. 6.
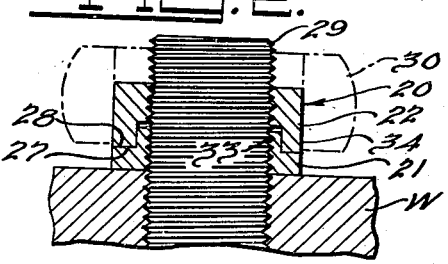
FIG. 3.
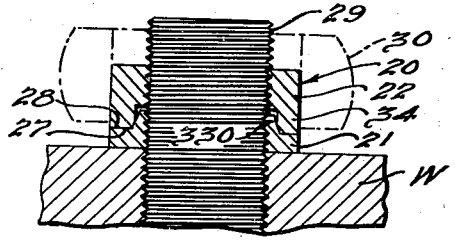
FIG. 7.
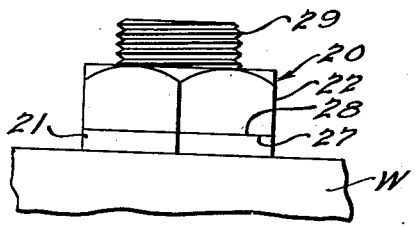
FIG. 4.
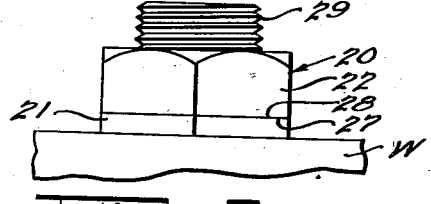
FIG. 8.
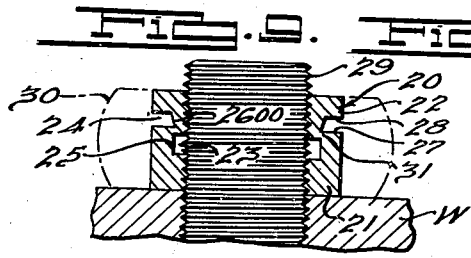
FIG. 9.   FIG. 10.
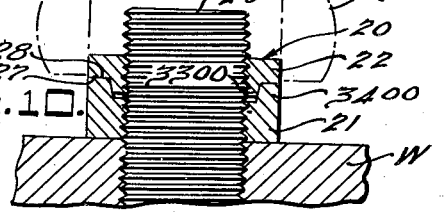
INVENTOR
BY Joseph M. Berge.
ATTORNEY Patented June 2, 1942

2,285,080

UNITED STATES PATENT OFFICE 2,285,080

LOCK NUT

Joseph M. Berge, Detroit, Mich., assignor to Eugene D. Williamson, Detroit, Mich.

Application December 16, 1941, Serial No. 423,152

3 Claims. (Cl. 151—19)

This invention relates to improvements in lock nuts and in particular to combined nuts and lock nuts of the frangible type.

In the prior art there have been numerous types of combined nuts and lock nuts formed of a single nut having a slot cut therearound leaving a thin frangible collar or tabs integrally connecting the lower nut portion and the upper lock nut portion. The collar or tabs of the said prior art combined nuts and lock nuts form into teeth or roughened surfaces between the lock nut portion and the nut portion upon fracturing one from the other, which roughened surfaces or teeth are intended to lock the said lock nut portion with respect to the nut portion when the lock nut portion is tightened against the nut portion. However, there is no positive assurance of these roughened surfaces or teeth remaining locked under severe conditions of vibration. Also it is impossible to tighten the lower face of the lock nut in surface to surface contact against the upper face of the nut because of the high spots provided by the said toothed or roughened surfaces whereby substantially all of the "jamb" effect between the lock nut and nut is lost.

With the foregoing in view, one object of the invention is to provide a frangible type combined nut and lock nut wherein full jamb effect is had upon tightening the lock nut portion against the nut portion after fracturing the said lock nut portion from the said nut portion.

A further object of the invention is to provide a frangible type combined nut and lock nut wherein both full jamb effect and thread gripping is had upon tightening the lock nut portion against the nut portion after fracturing the said lock nut portion from the said nut portion.

Other objects of the invention will become apparent by reference to the following detailed description taken in connection with the accompanying drawing, in which:

Fig. 1 is a side elevational view of a combined nut and lock nut embodying the invention threaded on a bolt against a piece of work before locking.

Fig. 2 is a vertical sectional view similar to Fig. 1.

Fig. 3 is a vertical sectional view of the combined nut and lock nut disclosed in Figs. 1 and 2 showing the lock nut portion thereof fractured from the nut portion and drawn tightly thereagainst.

Fig. 4 is a side elevational view of the combined nut and lock nut disclosed in Fig. 1 showing the lock nut portion thereof fractured from the nut portion and tightened thereagainst.

Fig. 5 is a side elevational view of another embodiment of the invention threaded on a bolt against a piece of work before locking.

Fig. 6 is a vertical sectional view similar to Fig. 5.

Fig. 7 is a vertical sectional view of the embodiment of the invention disclosed in Figs. 5 and 6 showing the lock nut portion thereof fractured from the nut portion and drawn tightly thereagainst.

Fig. 8 is a side elevational view of the embodiment of the invention disclosed in Fig. 5 showing the lock nut portion thereof fractured from the nut portion and tightened thereagainst.

Fig. 9 is a vertical sectional view through still another embodiment of the invention threaded on a bolt against a piece of work before locking.

Fig. 10 is a vertical sectional view of the embodiment of the invention disclosed in Fig. 9 showing the lock nut portion thereof fractured from the nut portion and drawn tightly thereagainst.

Referring now to the drawing wherein like numerals refer to like and corresponding parts throughout the several views, the illustrative embodiment of the invention disclosed in Figs. 1 to 4 inclusive comprises a frangible type combined nut and lock nut 20 composed of a nut portion 21 and a lock nut portion 22 formed from a standard nut by providing axially spaced inner and outer circumferential grooves 23 and 24 respectively; the said grooves 23 and 24 being of such a depth as to make the axially disposed wall 25 at the bottom of the inner circumferential groove 23 substantially in alignment with the axially disposed wall 26 at the bottom of the outer circumferential groove 24. The axial width of the inner circumferential groove 23 is slightly greater than the axial width of the outer circumferential groove 24 to admit of the axial face 28 of the lock nut portion 22 jambing against the opposed axial face 27 of the nut portion 21 when tightened thereagainst as shown in Fig. 3.

In using the said frangible type combined nut and lock nut 20, it is threaded on a bolt 29 by means of a wrench 30 as indicated by the dot and dash lines 30 in Fig. 2 until the bottom of the said combined nut and lock nut is tightened against the work W as shown in Figs. 1 and 2. The wrench 30 is then raised to engage the lock nut portion 22 of the said frangible combined nut and lock nut 20, and the annular connecting neck 31 which remains between the nut portion 21 and lock nut portion 22 of the said combined lock nut and nut 20 is fractured by turning the lock nut portion 22 further down on the bolt 29. The said lock nut portion 22 is then turned still further down on the bolt 29 until the axial face 28 thereof becomes jambed against the axial face 27 of the nut portion 21 as indicated in Figs. 3 and 4.

The rupture of the said annular connecting neck 31 between the nut portion 21 and the lock nut portion 22 of the frangible type combined nut and lock nut 20 occurs in a substantially axial direction whereby any undesirable point contact of ruptured surfaces which prevent axial jamb action of the axial face 28 of the lock nut portion 22 against the axial face 27 of the nut portion 21 are eliminated. Any roughened surfaces that exist after rupture of the annular connecting neck 31 wedge radially and cause binding action of the axially disposed collar 33 of the nut portion 21 against the threads of the bolt 29, this is because the axially disposed collar 34 of the lock nut portion 22 is radially thicker than the axially disposed collar 33 of the nut portion 21.

The embodiment of the invention disclosed in Figs. 5 to 8 inclusive is like and similar to the embodiment of the invention disclosed in Figs. 1 to 4 inclusive except that the axially disposed wall 260 at the bottom of the outer circumferential groove 24 is tapered as shown in Figs. 5 and 6 to provide positive wedge action of the tapered axially disposed collar 330 of the nut portion 21 against the threads of the bolt 29 by pressure of the axially disposed collar 34 of the lock nut portion 22 against the tapered axially disposed collar 330 of the nut portion 21 when the lock nut portion 22 is tightened against the nut portion 21.

The embodiment of the invention shown in Figs. 9 and 10 is similar in every respect to the embodiment of the invention disclosed in Figs. 5 to 8 inclusive except that the grooving is axially reversed. This causes the axially tapered wall 2600 at the bottom of the outer circumferential groove 24 to become a part of the lock nut portion 22 rather than a part of the nut portion 21 after fracture of the lock nut portion 22 from the nut portion 21, and provides positive wedge action of the tapered axially disposed collar 3300 of the lock nut portion 22 against the bolt 29 by pressure of the axially disposed collar 3400 of the nut portion 21 against the tapered axially disposed collar 3300 of the lock nut portion 22 when the lock nut portion 22 is tightened against the nut portion 21.

Although but several embodiments of the invention have been disclosed and described in detail, it is obvious that many changes may be made in the size, shape and arrangement of the elements thereof without departing from the scope of the invention defined by the appended claims, it being understood that the disclosure and drawing shall be interpreted in an illustrative and not a liimting sense.

I claim:

1. In a combined nut and lock nut of the frangible type formed from a single nut comprising a nut having slightly axially spaced inner and outer circumferential grooves therein cut to a radial depth to bring the walls of the nut at the base of said grooves substantially in axial alignment, the inner circumferential groove being axially wider than the outer circumferential groove.

2. In a combined nut and lock nut of the frangible type formed from a single nut threadable as a unit on a bolt comprising a nut having slightly axially spaced inner and outer circumferential grooves therein leaving a connecting neck between axially disposed portions of said nut, the walls of the nut at the base of said groove being substantially in axial alignment, the opposed annular radially disposed faces of the said nut at the outer groove being jambable in locked relationship against each other after the said connecting neck is fractured to form nut and lock nut portions and when said nut and lock nut portions are threaded on said bolt one toward the other.

3. In a combined nut and lock nut of the frangible type formed from a single nut threadable as a unit on a bolt comprising a nut having slightly axially spaced inner and outer circumferential grooves therein leaving a connecting neck between axially disposed portions of said nut, the walls of the nut at the base of said grooves being substantially in axial alignment, one groove being cut with the wall at the base thereof axially disposed and the other groove being cut with the wall at the base thereof axially tapered and engageable by the axially disposed wall after the said connecting neck is fractured to form nut and lock nut portions and when said nut and lock nut portions are threaded on said bolt one toward the other.

JOSEPH M. BERGE.